3,324,096
POLYMERIZATION OF CHLORO ALKYL
VINYL ETHERS
Paul Thomas Parker, Baton Rouge, La., assignor to Esso
Research and Engineering Company, a corporation of
Delaware
No Drawing. Filed Sept. 12, 1963, Ser. No. 308,367
16 Claims. (Cl. 260—91.1)

This invention relates to a process for preparing chlorine-containing polymers. More particularly this invention relates to a process for preparing high molecular weight polymers of chloroalkyl vinyl ethers.

It is well known in the art that chlorine-containing unsaturated monomers are relatively inactive toward polymerization in a cationic system. Such behavior is believed attributable to the severe deactivating effect of the chlorine substituent on the reacting center of the molecule in the cationic polymerization. On the other hand, except for said deactivating effect, such chlorine-containing monomers, for example, the chloroalkyl vinyl ethers, represent attractive monomers of possible potential in view of their ether linkage and their high chlorine content (about 33%). However, while the chloroalkyl vinyl ethers represent monomers which have potential for polymer utilization, prior to the present invention little success has been accomplished in the cationic polymerization of said chloroalkyl vinyl ethers.

It is an object of the present invention, therefore, to provide useful polymers from chloroalkyl vinyl ethers. It is a further object of the present invention to produce high molecular weight polymers, that is, polymers of a molecular weight of about 200,000 or above from chloroalkyl vinyl ether monomers. Other objects will appear hereinlater.

According to the present invention, it has been found that the above and other objects are accomplished by a process which comprises polymerizing a monochloroalkyl vinyl ether monomer containing 3 to 6 carbon atoms in the presence of a catalyst having the formula $AlCl_2SO_3Cl$, to a high molecular weight solid polymer.

The vinyl ether feeds suitable for the preparation of the polymers of this invention consist of chloroalkyl vinyl ethers in which the alkyl groups of said ethers contain from 1 to 4 carbon atoms, preferably 1 to 2 carbon atoms, and in which said alkyl groups contain a single chlorine substituent. Examples of suitable chloroalkyl vinyl ethers include those in which the alkyl group is a monochloro substituted: methyl, ethyl, propyl, isopropyl, butyl, or isobutyl group. Such chloroalkyl vinyl ethers can be represented by the structures:

$$CH_2=CHOCH_2Cl$$
$$CH_2=CHOCH_2CH_2Cl$$
$$CH_2=CHOCHClCH_3$$
$$CH_2=CHOCH_2CH_2CH_2Cl$$
$$CH_2=CHOCH(CH_3)CH_2Cl$$
$$CH_2=C(CH_3)OCH_2CH_2Cl$$
$$CH_2=CHO(CH_2)_3CH_2Cl$$

and the like.

The chloroalkyl vinyl ethers employed as starting materials are commercially available monomers and may be produced by a number of routes. For example, 2-chloroethyl vinyl ether is obtained along with some dioxane and smaller amounts of acetaldehyde and divinyl ether when liquid $\beta,\beta'$-dichlorodiethyl ether is reacted with sodium hydroxide at elevated temperatures. Another method of obtaining this monomer is by the reaction of acetaldehyde with chlorohydrin.

The catalyst employed, the concentration thereof utilized, and the manner of catalyst addition to the reaction are all critical features in the polymerization of the chloroalkyl vinyl ethers in accordance with the present invention.

Broadly, this invention employs as a catalyst a Friedel-Crafts catalyst in which one of the halide atoms appears to be replaced by a chlorosulfonate group to give dichloroaluminum chlorosulfonate, $AlCl_2SO_3Cl$.

In order to obtain the polymerization catalyst utilized in this invention, the method of preparation must be carefully regulated. According to one method, dry anhydrous aluminum chloride is mixed with an equimolar amount of chlorosulfonic acid ($HSO_3Cl$) at a temperature below about 170° F. with room temperature being preferred. There is no heat of reaction and there is no evolution of HCl at these temperatures. The mixture is then heated to about 170 to 180° F. under anhydrous conditions and HCl is then given off. After HCl evolution has ceased, usually a period of about 20 to 30 minutes, the product is a viscous paste. If this material is heated to substantially higher temperatures, a hard, salt-like product forms. This solid material is not soluble and does not act as a catalyst for the preparation of the vinyl ether polymers of the instant invention. The reaction which takes place under the prescribed conditions is believed to be:

$$AlCl_3+HSO_3Cl \rightarrow AlCl_2SO_3Cl+HCl$$

The precise structure of the catalyst is not known, but the empirical formula corresponds to $AlCl_2SO_3Cl$, and it will be referred to as such. It is essential to employ approximately equimolar amounts of aluminum chloride and chlorosulfonic acid to avoid exceeding the temperature limit during each of the two steps and to ensure that intimate contact between the two compounds is achieved. In the absence of intimate contact, or if there is a substantial molar excess of chlorosulfonic acid, it is possible that the reaction:

$$AlCl_3+2HSO_3Cl \rightarrow AlCl(SO_3Cl)_2+2HCl$$

may occur. (Here again, the structure of the sulfonated aluminum chloride is not precisely the above formula and is based on empirical data.) Monochloroaluminum bis-(chlorosulfonate) thus formed is a solid material which is relatively insoluble and not a good catalyst.

A second and preferred method of producing this catalyst employs 0.1 to 3.0% ethylchlorosulfonate in methylene chloride solution. The reaction is:

$$C_2H_5SO_3Cl+AlCl_3 \rightarrow AlCl_2SO_3Cl+C_2H_5Cl$$

and is carried out at room temperature in dilute methylene chloride solution. Equimolar amounts of ethylchlorosulfonate and aluminum chloride are used, and the mixture is stirred until all the aluminum chloride goes into solution. The concentration of the catalyst in the solution is between 0.6 and 5.0%. When prepared in this manner, the solution is ready to be used as a catalyst. (Evaporation of the solution leaves a viscous paste similar to the material prepared from aluminum chloride and chlorosulfonic acid in the dry state.)

Because of the tendency of some di-substituted aluminum chloride to be formed when relatively large amounts of catalyst are prepared, it is desirable to use a third procedure when preparing larger amounts. In this method, aluminum chloride is dissolved in sulfuryl chloride, $SO_2Cl_2$, to obtain a concentration of from 5 to 50%. An equimolar amount of chlorosulfonic acid is added at a slow rate so that a smooth, quiet HCl evolution takes place. This may be done at temperatures ranging from room temperature to about 100° F. For the production of 300 to 400 grams of catalyst, this addition procedure should take place over a period of several hours; it may take place overnight. The mixture is then refluxed until HCl evolution ceases, about 3 to 4 hours. The sulfuryl chloride solvent is then removed at reduced pressure to leave a viscous liquid whose analysis corresponds to $AlCl_2SO_3Cl$. The conditions under which the solvent is removed are critical, for if temperatures are too high, an insoluble product is obtained which has poor catalytic properties. At high vacuum, the temperature must be below 160° F., preferably 140° F.

The dichloroaluminum chlorosulfonate catalyst, when obtained, must be kept in a dry atmosphere to prevent formation of an insoluble hydrate. This hydrate, insoluble in methylene dichloride, is a gray solid which forms instantaneously upon contact with moisture. The actual structure of the catalyst is not known, but corresponds closely to an analysis calculated for dichloroaluminum chlorosulfonate:

|  | Found, Wt. percent | Calculated for $AlCl_2SO_3Cl$, Wt. percent |
| --- | --- | --- |
| Aluminum | 11.8 | 11.76 |
| Chlorine | 46.4 | 46.37 |
| Sulfur as Sulfate | 41.8 | 41.87 |
| Total | 100.0 | 100.00 |

The elemental analysis indicates that the material is not a simple complex between aluminum chloride and a chlorosulfonic acid or between aluminum chloride and sulfuryl chloride. The fact that this material is a viscous liquid is surprising in view of the fact that inorganic salts of aluminum are solids.

In addition to the dichloroaluminum chlorosulfonate catalyst, substitution of one of the halide atoms in other Friedel-Crafts type catalysts by chlorosulfonate groups would yield active polymerization catalysts which will produce polymers with high molecular weight in accordance with this invention. Among the Friedel-Crafts type catalyst which may be so substituted are beryllium chloride, titanium trichloride, titanium tetrachloride, gallium chloride, stannous chloride, stannic chloride, molybdenum chloride, chromium chloride, etc.

In the preferred procedure for producing the polymers of this invention the mixture of monomeric materials is brought to the desired low reaction temperature, which is usually below 32° F. and ordinarily between −50° F. and −175° F. and more preferably between −140° F. and −150° F. by any suitable means such as the addition of internal refrigerants. It is also desirable to dilute the monomeric reactants with a low-freezing, nonpolymerizable solvent. Usually about 500 to 2000 parts of solvent are added per 100 parts of chloroalkyl vinyl ether monomer, with preferably 800 to 1200 parts per 100 parts divinyl ether being employed.

One preferred class of solvents for use with the present invention is $C_1$ to $C_5$ alkyl halides, i.e., monohalides and polyhalides. Thus, suitable solvents include methyl chloride, ethyl chloride, methyl bromide, methylene chloride, carbon tetrachloride, etc., preferably methyl or methylene chloride. In addition, carbon disulfide and its analogues and homologues may be used. When the dichloroaluminum chlorosulfonate catalyst is prepared by the reaction of aluminum chloride and ethyl chlorosulfonate in a solution of methylene chloride, the catalyst formed in this solution is ready for use in polymerization if methylene chloride is chosen as the polymerization medium. Although liquid saturated hydrocarbon solvent may ordinarily be used for Friedel-Crafts type polymerization reactions, it has been discovered that the use of liquid saturated hydrocarbons with the catalyst of this invention does not result in an increase of molecular weight in the product polymer and, in fact, is herein later shown to exhibit low molecular weight in the product polymer.

After cooling to reaction temperature the monomeric reaction mixture is brought into contact with the dichloroaluminum chlorosulfonate catalyst while maintaining the temperature within the desired range.

As hereinbefore mentioned, a feature of this invention is the required use of critical catalyst concentrations in order to reproduce polymer products having the desired high molecular weights. Thus, in accordance with the instant invention, a concentration of about 1.5 to 3.5 weight percent of catalyst on vinyl ether, monomer must be employed with about 2.5 to 3.0 weight percent of catalyst on vinyl ether monomer being especially preferred. While use of concentrations of catalysts either above or below the above range, e.g. 0.5 to 5.0 weight percent results in what may be considered satisfactory polymerization, it is found that the molecular weight of the polymer product is greatly decreased as a consequence of such use.

Also as hereinbefore mentioned, another critical variable which is found to influence the polymer product molecular weight is the manner of catalyst addition. Thus, polymer product molecular weight is optimized if the catalyst is added to the monomeric reaction mixture in a plurality of portions and over a period of time, for example, from 2 to 5 additions over a period of 30 minutes or less. After the reaction has been initiated, the preferred schedule of catalyst addition comprises 2 or 3 incremental additions, being from about 0.5 to 3 minutes apart. Further, resulting molecular weights are found to be especially optimized if at least an equal or greater proportion of the total catalyst is added in the second portion of a two-portion catalyst addition. Thus, in a catalyst addition consisting of two portions, the preferred method is represented by an initial addition of about 45 to 50% of the total concentration of the catalyst to be added followed about 2 or 3 minutes later by addition of the remaining 50 to 55% of the catalyst. Representative of a catalyst addition consisting of 3 portions, is an addition about 42% of the total catalyst in the first portion added, about 42% of the total catalyst in the second portion added and about 16% of the total catalyst in the third and final portion added, each of said portions being spaced a period of from about 0.5 to 3 minutes apart. Utilization of the above technique is found to enhance the molecular weight of the polymer product by a factor of from two to four.

When the monomer mixture and the catalyst are efficiently intermingled at reaction temperature, the polymerization reaction takes place smoothly and rapidly enough to produce a polymer, in solution, in a few minutes, e.g., conversion of 75–95% in periods of 3–5 minutes. The polymer product remains in solution and does not precipitate out and as the polymerization proceeds, the solution viscosity increases. The polymers thus prepared are largely insoluble in diisobutylene. They may be recovered by evaporation or by dilution with a nonsolvent, for example, an alcohol such as isopropanol.

As so prepared, the polymer product has a Staudinger molecular weight between about 100,000 and about 350,000 and under preferred conditions, between 200,000 and 350,000.

It is also contemplated by the present invention that in addition to the chloroalkyl vinyl ethers, the monomeric mixture to be polymerized to produce the polymer product of this invention may also contain, if desired, but not essentially minor proportions, preferably in the range of about 1 to 25 percent by weight of one or more olefins copolymerizable with chloroalkyl vinyl ether by the process of the present invention. Such olefins include: isoolefins, preferably containing 4 to 7 carbon atoms as isobutylene and the like; acyclic conjugated diolefins as butadiene-1,3, isoprene, 2,3-dimethyl butadiene-1,3, piperylene, hexadiene-2,4, and the like; aliphatic non-conjugated diolefins such as dimethallyl; alicyclic diolefins, both conjugated and non-conjugated such as cyclopentadiene, dicyclopentadiene, methylcyclopentadiene, 1-vinyl cyclohexene-3, 1-vinyl cyclohexene-1, and the like; acyclic triolefins such as myrcene and the like; as well as other polyolefins containing preferably a total of about 4 to about 10 carbon atoms.

The following specific examples illustrate preferred embodiments of the invention in more detail. They illustrate the preparation of preferred chloroalkyl vinyl ethers and demonstrate their advantageous properties. They are not, however, to be considered as limiting the invention to the details therein set forth since numerous variations and modifications in procedure and materials, in accordance with the foregoing general disclosure, will be apparent to those skilled in the art.

*Example I*

In the following example, 2-chloroethyl vinyl ether was polymerized using dichloroaluminum chlorosulfonate as catalyst in a number of illustrative runs. The dichloroaluminum chlorosulfonate catalyst was prepared by reacting anhydrous aluminum chloride and ethyl chlorosulfonate in methylene dichloride solution at room temperature. The resulting catalyst solution was then employed in the polymerization reactions. In the following Table I, the catalyst concentrations and the reaction conditions employed are set forth in tabular form along with conversion and molecular weight data. All reaction times were 30-minute periods with about 5 to 7 volume percent of monomer being employed in the methyl chloride diluent.

TABLE I.—HOMOPOLYMERIZATION OF 2-CHLOROETHYL VINYL ETHER
[AlCl$_2$SO$_3$Cl catalyst]

| Run No. | Wt. percent Catalyst on Ether | Diluent | Reactor Temp., °F. | Conversion, percent | Mol. Wt.[1] ×10$^{-3}$ |
|---|---|---|---|---|---|
| 1 | 2.15 | CH$_3$Cl | −145 | 56 | 157 |
| 2 | 2.5 | CH$_3$Cl | −145 | 99 | 276 |
| 3 | 2.67 | CH$_3$Cl | −145 | 100 | 332 |

[1] Relative molecular weight determined in CHCl$_3$.

*Example II*

Under polymerization conditions similar to those set forth in Example I, various polymers of 2-chloroethyl vinyl ether were prepared. In these runs the amount of catalyst (dichloroaluminum chlorosulfonate) concentration was varied and its effect on molecular weight is illustrated by three comparable 30-minute runs in which the catalyst was added at the initiation of the reaction.

TABLE II

| Run No. | Wt. percent Catalyst on Ether | Temperature, °F. | Conversion, percent | Mol. Wt. ×10$^{-3}$ |
|---|---|---|---|---|
| 1 | 1.9 | −150 to −135 | 25 | 91 |
| 2 | 2.5 | −150 to −135 | 99 | 276 |
| 3 | 3.15 | −150 to −135 | 98 | 126 |

The table indicates that in order to achieve optimized molecular weight it is desirable to have the catalyst concentration of about 2.5–3.0 weight percent based on the weight of the monomer. It was also found that increasing the amount of catalyst concentration beyond a certain point did not further increase the product polymer molecular weight.

*Example III*

In order to illustrate that the manner of catalyst addition is a variable which critically influences the polymer product molecular weight, a series of runs were effected in a manner similar to Example I and II except that the catalyst was added in separate portions in Run Nos. 2, 4, and 5, in the amounts and time periods set forth. Illustrative data are set forth below.

TABLE III.—EFFECT OF TIMED CATALYST ADDITION

| | Run No. | | | | | | | | |
|---|---|---|---|---|---|---|---|---|---|
| | 1 | 2 | | 3 | 4 | | 5 | | |
| Dichloroaluminum Chlorosulfonate Catalyst: Weight Percent on Ether | 3.15 | 3.2 | | 2.9 | 2.9 | | 2.9 | | |
| Catalyst Addition: Time, Minutes | 0 | 0 | 3 | 0 | 0 | 3 | 0 | 0.5 | 1 |
| Percent Total Catalyst Added | 100 | 45 | 55 | 100 | 42 | 58 | 42 | 42 | 16 |
| Conversion, Percent | 98 | 100 | | 97 | 98 | | 97 | | |
| Molecular Weight×10$^{-3}$ | 126 | 284 | | 112 | 253 | | 251 | | |

From the above it is obvious that higher polymer molecular weights are obtained if the catalyst is added portionwise over a time period of a few minutes.

*Example IV*

In the following example, 2-chloroethyl vinyl ether was polymerized using dichloroaluminum chlorosulfonate as catalyst. The catalyst was prepared according to the procedure set forth in Example I. The resulting catalyst solution was then added in two separate portions to the polymerization reactions. In all runs (1–4) the catalyst was added in two substantially equal portions; in Run Nos. 1 and 2 said portions were 1 minute apart and in Run Nos. 3 and 4 they were 3 minutes apart. In the following Table IV the catalyst concentrations and the reaction conditions employed are set forth in tabular form along with conversion and molecular weight data.

TABLE IV.—HOMOPOLYMERIZATION OF 2-CHLOROETHYL VINYL ETHER
[AlCl$_2$SO$_3$Cl catalyst]

| Run No. | Wt. percent Catalyst on Ether | Diluent | Reactor Temp., °F. | Reaction Time, Min. | Conversion, percent | Mo. Wt. ×10$^{-3}$ |
|---|---|---|---|---|---|---|
| 1 | 2.2 | CH$_2$Cl$_2$ | −140 to −126 | 5 | 77 | 299 |
| 2 | 2.2 | CH$_2$Cl$_2$ | −140 to −133 | 5 | 76 | 308 |
| 3 | 2.5 | CH$_2$Cl$_2$ | −140 to −128 | 8 | 75 | 235 |
| 5 | 3.1 | CH$_2$Cl$_2$ | −145 to −111 | 30 | 95 | 216 |

These data clearly indicate that dichloroaluminum, when employed as catalysts in apportioned additions, consistently yield polymers of chloroalkyl vinyl ethers having relatively high molecular weights.

*Example V*

Dichloroaluminum chlorosulfate catalyst produced according to the method of Example I was used to polymerize monomer reaction mixtures of 2-chloroethyl vinyl ether and various diluents. The polymers were produced under the conditions of Example I. The percent conversion and molecular weights were measured and the results are tabulated in Table V.

TABLE V

| Run No. | Diluent | Wt. percent AlCl$_2$SO$_3$Cl on Ether | Temp., °F. | Conversion, percent | Mol. Wt. ×10$^{-3}$ |
|---|---|---|---|---|---|
| 1 | CH$_3$Cl | 2.5 | −150 to −136 | 99 | 276 |
| 2 | CH$_2$Cl$_2$ | 2.2 | −140 to −126 | 77 | 299 |
| 3 | Toluene | 1.9 | −144 to −137 | 71 | 176 |
| 4 | n-Pentane | 1.6 | −104 to −92 | 83 | 121 |

The table indicates that the highest molecular weight polymers have been produced at the lowest temperature with methyl chloride and methylene dichloride as diluent. In the less polar diluents, such as toluene and n-pentane, the polymer molecular weights have been significantly lower.

What is claimed is:

1. A process for producing monochloroalkyl vinyl ether polymers which comprises polymerizing in an alkyl halide solvent a monochloroalkyl vinyl ether in the presence of a catalyst having the formula AlCl$_2$SO$_3$Cl and at temperatures below about 32° F.

2. The process of claim 1 in which the vinyl ether is a C$_3$–C$_6$ monochloroalkyl vinyl ether.

3. The process of claim 1 in which the catalyst is employed in amounts of from 0.5 to 5.0 weight percent based on the vinyl ether monomer.

4. The process of claim 1 in which the catalyst is added portionwise to the polymerization mixture over a period of up to 30 minutes.

5. The process of claim 1 in which the polymerization is carried out at temperatures of from about −50° F. to −175° F.

6. The process of claim 1 in which the alkyl halide solvent is employed in amounts of from about 500 to 2000 parts of solvent per 100 parts of vinyl ether monomer.

7. A process for producing high molecular weight polymers from a monochloroalkyl vinyl ether which comprises polymerizing in a C$_1$–C$_5$ alkyl halide solvent a C$_3$–C$_6$ monochloroalkyl vinyl ether in the presence of from about 1.5 to 3.5 weight percent based on vinyl ether monomer of a catalyst having a formula AlCl$_2$SO$_3$Cl and at a temperature between about −50° F. and −175° F.

8. The process of claim 7 in which the chloroalkyl vinyl ether is 2-chloroethyl vinyl ether.

9. The process of claim 7 in which the catalyst is employed in amounts of from about 2.5 to 3.0 weight percent based on the vinyl ether monomer.

10. The process of claim 7 in which the catalyst is added to the polymerization mixture in from 2 to 3 portions, each of said portions being added about 0.5 to 3 minutes apart.

11. The process of claim 7 in which the polymerization is carried out at temperatures of from about −140° F. to −150° F.

12. The process of claim 7 in which the C$_1$–C$_3$ alkyl halide solvent employed is selected from the group consisting of methylchloride and methylene chloride.

13. A process for producing high molecular weight polymers from a chloroalkyl vinyl ether which comprises polymerizing in a C$_1$ alkyl chloride solvent a C$_3$–C$_4$ monochloroalkyl vinyl ether in the presence of from about 2.5 to 30 weight percent based on vinyl ether monomer of a catalyst having the formula AlCl$_2$SO$_3$Cl at a temperature of from about −140 to −150° F. to a polymer having a Staudinger molecular weight of from about 200,000 to about 350,000.

14. The process of claim 13 in which the chloroalkyl vinyl ether is 2-chloroethyl vinyl ether.

15. The process of claim 13 in which the catalyst is added to the polymerization mixture in 2 substantially equal portions each of said portions being added 0.5 to 3 minutes apart.

16. The process of claim 13 in which the alkyl chloride solvent is methylene chloride.

References Cited

UNITED STATES PATENTS

| 3,025,281 | 3/1962 | Chiang | 260—91.1 |
| 3,025,283 | 3/1962 | Heck et al. | 260—91.1 |
| 3,098,061 | 7/1963 | Heck | 260—91.1 |

JOSEPH L. SCHOFER, *Primary Examiner.*

M. B. KURTZMAN, *Assistant Examiner.*